3,101,806
Patented Aug. 27, 1963

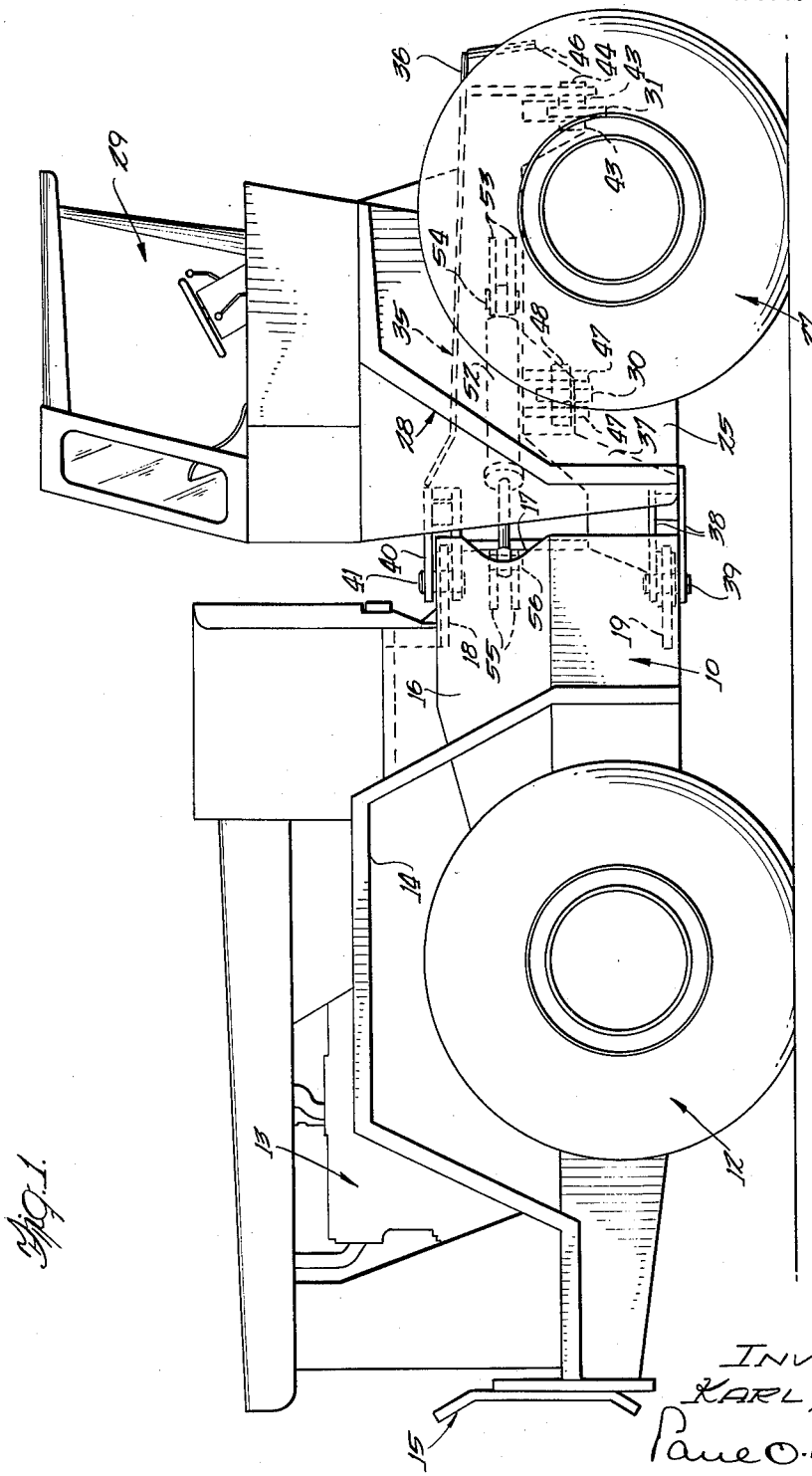

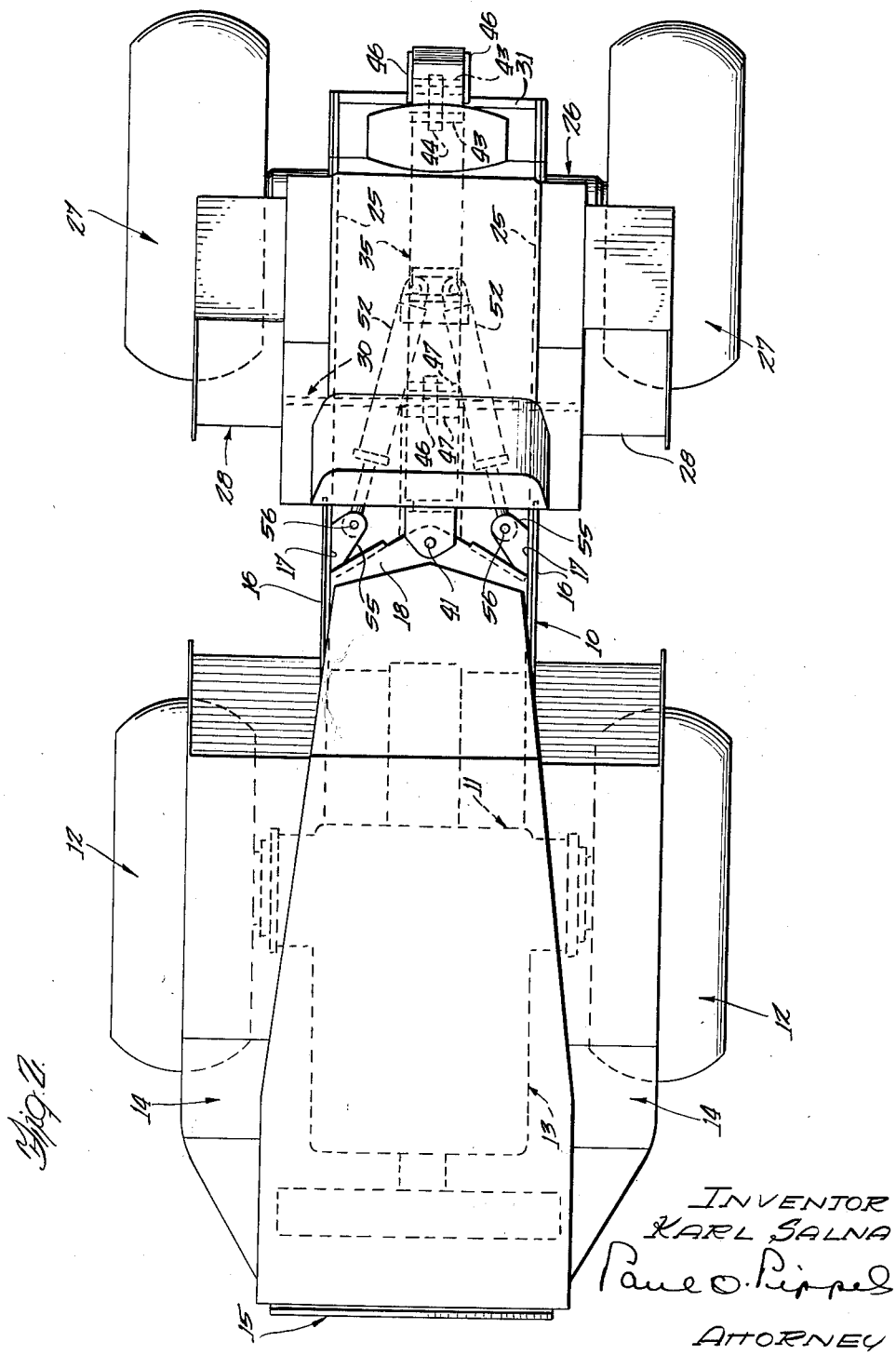

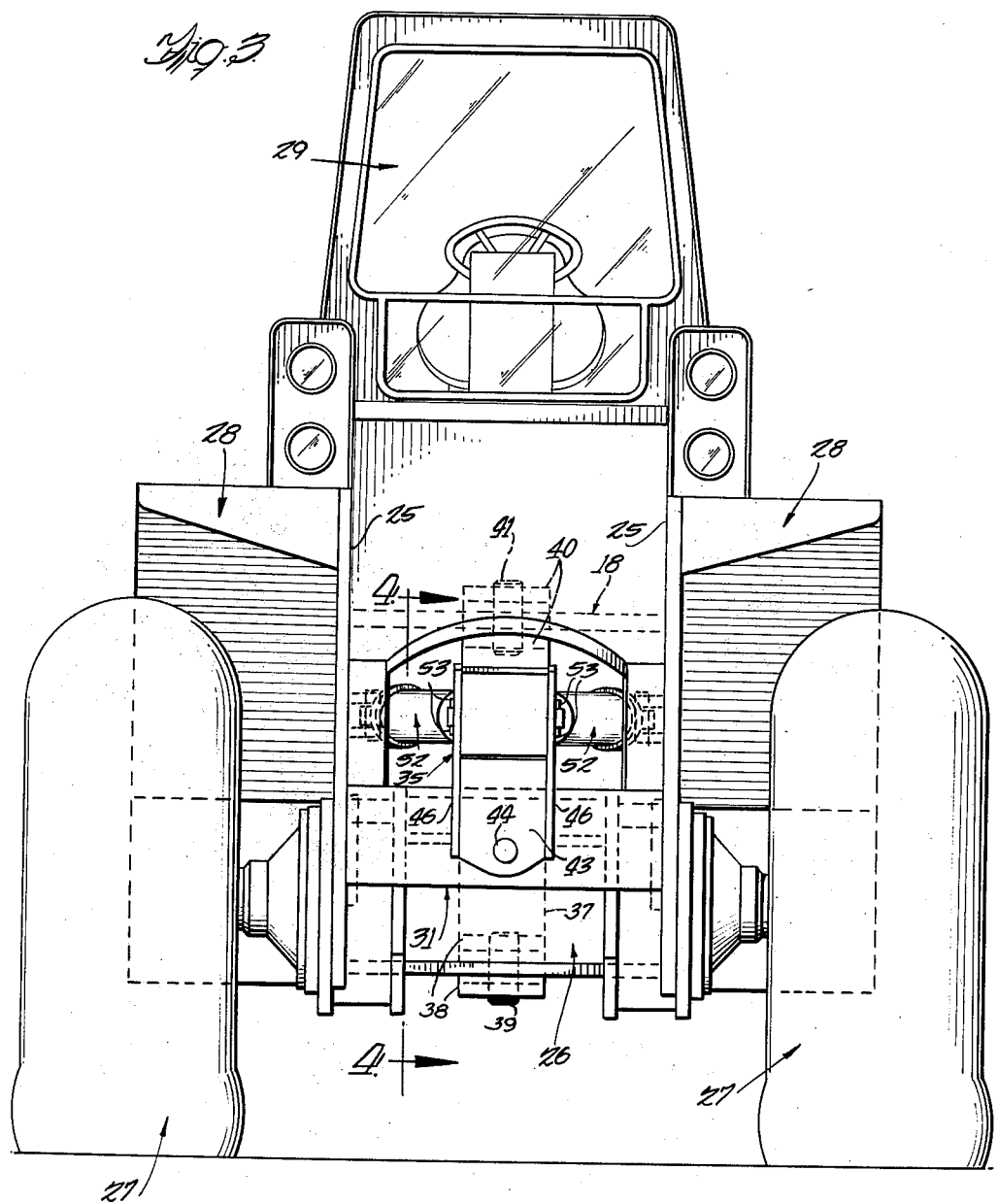

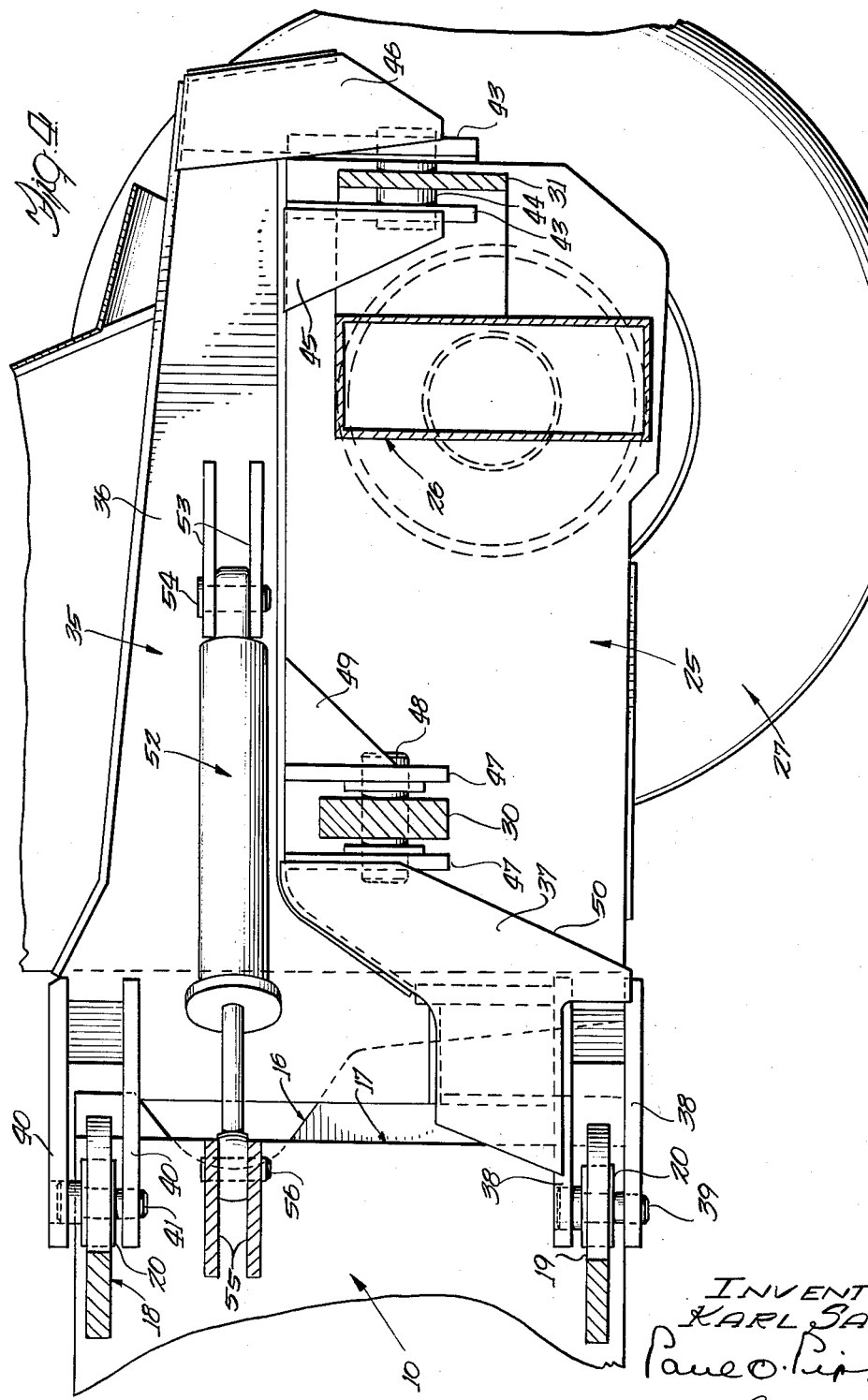

3,101,806
ARTICULATED MOTOR VEHICLE
Karl Salna, Mundelein, Ill., assignor to The Frank G. Hough Co., a corporation of Illinois
Filed Feb. 9, 1961, Ser. No. 88,114
12 Claims. (Cl. 180—52)

This invention relates generally to motor vehicle constructions, and more specifically to an improved body and frame construction for an articulated tractor.

In the motor vehicle art, the use of articulated vehicles has developed as the advantages of vehicles of this type have become apparent with the use of certain types of material handling arrangements, and particularly in the area of earth moving.

It is the object of the present invention to provide an articulated tractor construction which is relatively simple in detail and yet provides good steering characteristics and stability of the tractor, especially when used with various types of material handling implements such as bulldozer blades and wherein the loads on the various pivoting members are divided to decrease wear and increase the life of the relatively heavily loaded members and pins.

It is a further object of the present invention to provide an articulated tractor construction wherein the rearward portion of the tractor carries the power plant or engine for the tractor and wherein the forward section of the tractor carries the operator's compartment with a resulting good load or weight distribution for increased stability and component life.

It is a further object of the present invention to provide a steering yoke arrangement for an articulated tractor having a rearward engine section and a forward operator's section wherein a relatively large angle of steering between the two sections of the vehicle is permitted, wherein the forward section may oscillate about a longitudinally central axis through the vehicle and wherein good stability of the tractor is achieved.

Other objects and features of the present invention will be apparent upon a perusal of the following specification and drawings of which:

FIG. 1 is a side elevational view of a tractor constructed according to the present invention;

FIG. 1 is a side elevational view of a tractor constructed according to the present invention;

FIG. 2 is a top plan view of the articulated tractor arrangement of FIG. 1;

FIG. 3 is a front elevational view of the tractor of FIGS. 1 and 2; and

FIG. 4 is an enlarged partial cross-sectional view of the tractor of the other figures and taken substantially along the line 4—4 of FIG. 3.

The present embodiment is the preferred embodiment, but it is to be understood that changes can be made in the present embodiment by one skilled in the art without departing from the spirit and scope of the present invention.

For a general description of the present invention reference is made to the drawings. The present invention comprises an articulated tractor having a rearward section and a forward section. The rearward section carries the engine or power plant for the tractor and is supported on a pair of wheels. The forward section is relatively short in comparison to the rearward section and carries the operator's compartment therein. The forward section is also supported on a pair of wheels. The portion of the forward section below the operator's compartment is somewhat bifurcated or hollowed out so that an open tunnel is provided extending longitudinally therethrough. The side portions of the front section extend downwardly as a pair of spaced-apart plates and are carried and secured to each end of the forward wheel and axle assembly immediately inwardly of the wheels thereof. The forward and rearward tractor sections are interconnected by a somewhat L-shaped yoke member. A pair of flanges and pins are carried at each end of one leg of the yoke member and are operatively connected in a vertically spaced relationship to the forward end of the rearward tractor section at the transverse center thereof. The other leg of the yoke extends forwardly of the rearward section and through the tunnel of the forward tractor section. A second pair of flanges and pins is provided, and each of these is secured to the underside of one end of the other leg of the yoke and are pivotally connected to transverse supporting members secured between the frame plates so that the pair of forward and rearward flanges and pins straddle the forward axle housing. Hydraulic ram means are also provided and connected between the horizontal leg of the yoke and the forward side sections of the rearward tractor section to provide for steering of the tractor by a pivoting of the forward section relative to the rearward section about a vertical axis positioned between the forward and rearward sections and at the transverse center of the tractor. The longitudinal central horizontal axis of pivoting between the yoke and the forward tractor section provides for oscillation of the forward tractor section relative to the rearward tractor section about a longitudinal center line of the tractor. This axis is positioned a short distance upwardly of the axis of the forward axle assembly. In oscillating, the yoke will move from one side to the other of the tunnel portion of the forward section of the tractor.

Turning next to a detailed description of the present invention, continued reference is made to the drawing. The rearward section of the tractor comprises a rear frame 10 carried on an axle assembly 11 which in turn is supported by the rear wheels 12. An engine or power plant compartment 13 is carried on the frame 10. The frame 10 has a width less than the distance between the rear wheels 12 and fenders 14 are secured to the frame 10 to extend over the rear wheels 12. The rearward end of the frame 10 carries a pusher plate 15. The forward end of the frame 10 is provided with a pair of forwardly extending spaced-apart side plates 16, which may easily be seen in FIG. 2. Secured to the inward side of each plate 16 is a reinforcing plate 17. An upper cross member 18 is secured between the plates 17 adjacent the upper end thereof and a lower supporting member 19 is secured between the plates 17 adjacent the lower end thereof. The supporting members 18 and 19 have their forward edges formed to provide a somewhat pointed section extending forwardly at the transverse center of the frame 10. Openings and bushings 20 are provided in the supporting members 18 and 19 for carrying the pins of the yoke arrangement.

The frame member for the forward section of the tractor comprises a pair of vertical plates 25 which are carried in a spaced-apart relationship to each other at each side of the axle housing 26 for the forward wheels 27. The plates 25 need not each be a single plate but can be made up from a number of plates bolted or welded together. Fenders 28 for the forward wheels 27 are carried on the outer side of the plates 25. The operator's compartment 29 is supported on and extends between the plates 25. In addition to the axle housing 26 which extends between the plates 25 in the lower portion thereof two supporting members 30 and 31 are also provided extending between the plates 25 in the lower portion thereof. The member 30 is secured between the frame members 25 adjacent the rearward end of the front tractor section and substantially horizontally in alignment with the upper portion of the axle housing 26 of the forward wheels 27 and above the axis of rotation of the front wheels 27. The supporting member 31 is secured between the frame members 25 adjacent the forward end of the forward tractor section and also substantially in horizontal alignment with the upper portion of the axle housing 26 and above the axis of rotation of the front wheels 27. The operator's compartment 29 and upper body portion of the forward tractor section terminates on the lower side thereof at a position substantially above the top of the supporting members 30 and 31 and the axle housing 26 so that a somewhat open tunnel is provided which is defined by the underside of the operator's compartment and upper body portion, the frame members 25 and a plane through the top of the support members 30 and 31 and the axle housing 26.

The yoke 35 which operatively interconnects the forward and rearward sections of the tractor may best be seen in FIG. 4. The yoke 35 is somewhat L-shaped having a horizontal leg 36 of substantial length and a vertical leg 37. In the present embodiment of the invention the yoke 35 is formed of a generally I-beam construction, however, it may also be formed in a box-beam construction. The lower end of the vertical leg 37 is provided with a pair of rearwardly extending spaced-apart flanges 38. A pair of holes are provided through the flanges 38 for alignment with the hole in the bushing 20 of the plate 19 of the rearward tractor section and for insertion of the pin 39 to pivotally interconnect the lower end of the leg 37 with the rearward tractor section for pivotal movement about the vertical axis through pin 39. The upper end of the leg 37 is provided with a pair of rearwardly extending spaced-apart flanges 40. The pair of flanges 40 are also provided with a pair of holes therethrough for axial alignment with the hole in the bushing 20 of the upper supporting member 18 and insertion of the pin 41 therethrough to pivotally interconnect the upper end of the leg 37 of the yoke 35 to the rearward tractor section. The various plates and flanges are so disposed that the longitudinal axes of pins 39 and 41 coincide on a transversely central vertical line between the forward and rearward tractor sections. The yoke 35 extends forwardly of the rearward tractor section into and through the defined tunnel portion of the forward tractor section. The forward end of the horizontal leg 36 is provided with a pair of spaced-apart depending flanges 43. The flanges 43 are positioned one on each side of the supporting member 31 and a pin 44 is journaled through the flanges 43 and the supporting member 31 with the longitudinal axis of the pin 44 positioned transversely centrally of the forward tractor section. The flanges 43 are reinforced by plates 45 and 46. The horizontal leg 36 of the yoke 35 is further provided with another pair of flanges 47. The pair of flanges 47 are secured to the underside of the horizontal leg 36 adjacent the junction of the horizontal leg 36 with the vertical leg 37 to depend from the horizontal leg 36 in a spaced relationship thereon longitudinally of the horizontal leg 36. The yoke 35 and the flanges 47 are reinforced by the plates 49 and 50. The depending flanges 47 are further positioned one on each side of the cross member 30 and a pin 48 is journaled through the flanges 47 and the cross member 30 to pivotally support the yoke 35 on the cross member 30. The longitudinal axis of the pin 48 is positioned similarly to pin 44 at a position transversely centrally of the forward tractor section. Thus it may be seen that the yoke 35 is pivotable generally about the longitudinal axes of the pins 44 and 48.

From the foregoing it may be seen that the forward tractor section may oscillate about a transverse center line of the tractor relative to the rearward tractor section and that the forward and rearward tractor sections are pivotable relative to each other about a vertical axis positioned between the forward and rearward tractor sections and transversely centrally thereof.

Steering of the tractor of the present invention is accomplished by a pair of hydraulic rams 52. The head end of each hydraulic ram 52 is pivotally connected to one side of the horizontal leg 36 of the yoke 35 intermediate the ends thereof by means of a pair of flanges 53 and a pin 54. Each pair of flanges 53 is secured to one side of the horizontal leg 36 of the yoke 35 in a position substantially longitudinally midway of the horizontal leg 36. The rod end of each hydraulic ram 52 is pivotally connected to a pair of flanges 55 by a pin 56. Each pair of flanges 55 is secured to one of the forwardly extending plates 17 of the rearward tractor section. Steering of the tractor is accomplished by extending one of the hydraulic rams 52 simultaneously with the retraction of the other hydraulic ram 52. Suitable hydraulic fluid pump, valve, and conduit means (not shown) are supplied for selective operation of the hydraulic rams 52 to provide the steering operation for the tractor.

Having described the invention, what is considered new and desired to be protected by Letters Patent is:

1. In an articulated motor vehicle construction, a first body and frame section carried on a pair of wheels, a second body and frame section carried on a second pair of wheels, a tunnel formed through said first body and frame section, means pivotally interconnecting said first and second body and frame sections for relative pivotal movement about a first axis disposed between said first and second body and frame sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said tunnel of said first body and frame section, said horizontal leg having a pair of longitudinally spaced apart outwardly extending members, said first body and frame section having a pair of upwardly extending members carried in said tunnel and positioned one on each side of the axis of rotation of said first pair of wheels, pin means connecting each of said extending members of said horizontal leg to one of said upwardly extending members in said tunnel for pivotal movement of said first body and frame section about said second axis, said vertical leg of said yoke being positioned to depend from said horizontal leg and connected to said second body and frame section for pivoting of said first body and frame section relative to said second body and frame section about said first axis.

2. In an articulated motor vehicle construction, a forward vehicle section carried on a pair of wheels, a rearward vehicle section carried on a second pair of wheels, a tunnel formed through said forward vehicle section above the axis of said forward wheels, means pivotally interconnecting said forward and rearward vehicle sections for relative pivotal movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said tunnel of said forward vehicle section, said horizontal leg having a pair of longitudinally spaced apart outwardly extending members, said forward vehicle section having a pair of upwardly extending members carried in said tunnel and positioned one on each side of the axis of rotation of said first pair of wheels, pin means connecting each of said extending members of said horizontal leg to one of said upwardly extending members in said tunnel for pivotal movement of said forward section about said second axis, said vertical leg of said yoke being positioned to depend from said horizontal leg and connected to said rearward vehicle section for pivoting of said forward vehicle section relative to said rearward vehicle section about said first axis.

3. In an articulated motor vehicle construction, a forward vehicle section carried on a pair of wheels and comprising an operator's compartment, a rearward vehicle section carried on a second pair of wheels and comprising an engine compartment for said vehicle, a tunnel formed longitudinally through said forward vehicle section above the axis of the forward wheels and below said operator's compartment, means pivotally interconnecting said forward and rearward vehicle sections for relative pivotal movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said tunnel of said forward vehicle section, said horizontal leg having a pair of longitudinally spaced apart outwardly extending members, said forward vehicle section having a pair of upwardly extending members carried in said tunnel and positioned one on each side of the axis of rotation of said first pair of wheels, pin means connecting each of said extending members of said horizontal leg to one of said upwardly extending members in said tunnel for pivotal movement of said forward section about said second axis, said vertical leg of said yoke being positioned to depend from said horizontal leg and connected to said rearward vehicle section for pivoting of said forward vehicle section relative to said rearward vehicle section about said first axis.

4. In an articulated motor vehicle construction, a first body and frame section carried on a pair of wheels, a second body and frame section carried on a second pair of wheels, a portion of said first body and frame section comprising a pair of spaced-apart plates supporting an upper body portion thereof to define a tunnel below said body portion and between said plates, means pivotally interconnecting said first and second body and frame sections for relative pivotal movement about a first axis disposed between said first and second body and frame sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said tunnel of said first body and frame section, said horizontal leg having a pair of longitudinally spaced apart outwardly extending members, said first body and frame section having a pair of upwardly extending members carried in said tunnel and positioned one on each side of the axis of rotation of said first pair of wheels, pin means pivotally connecting each of said extending members of said horizontal leg to one of said upwardly extending members in said tunnel for pivotal movement of said body and frame section about said second axis, said vertical leg of said yoke being positioned to depend from said horizontal leg and connected to said second body and frame section for pivoting of said first body and frame section relative to said second body and frame section about said first axis.

5. In an articulated motor vehicle construction, a forward vehicle section carried on a first pair of wheels, a rearward vehicle section carried on a second pair of wheels, said rearward vehicle section including an engine compartment, said forward vehicle section comprising a frame portion and an operator's compartment, said frame portion comprising a pair of spaced-apart plates supporting said operator's compartment a certain distance above the axis of said first pair of wheels to define a tunnel extending longitudinally through said forward vehicle section below said operator's compartment and between said plates, means pivotally interconnecting said forward and rearward vehicle sections for relative pivotal movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said defined tunnel of said forward vehicle section, said horizontal leg having a pair of longitudinally spaced apart depending members, said forward vehicle section having a pair of upwardly extending members carried in said tunnel and positioned one on each side of the axis of rotation of said first pair of wheels, pin means pivotally connecting each of said depending members of said horizontal leg to one of said upwardly extending members in said tunnel for pivotal movement of said forward section about said second axis, said vertical leg of said yoke being positioned to depend from said horizontal leg and connected to said rearward vehicle section for pivoting of said forward vehicle section relative to said rearward vehicle section about said first axis.

6. In an articulated motor vehicle construction, a first body and frame section, a first pair of wheels carried at each end of an axle assembly, the frame portion of said first body and frame section comprising a pair of spaced-apart plates, means connecting each of said plates to said axle assembly at each end thereof and between said first pair of wheels so that said pair of plates upstand therefrom, the body portion of said first body and frame section being formed and carried at the upper end of said pair of plates so that an opening of substantial size is formed longitudinally through said first body and frame section and defined by the upper side of said axle assembly, said pair of plates and the underside of said body portion of said first body and frame section, a second body and frame section carried on a second pair of wheels, means pivotally interconnecting said first and second body and frame sections for relative pivotal movement about a first axis disposed between said first and second body and frame sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said opening of said first body and frame section, said horizontal leg having a pair of longitudinally spaced apart depending members, said first body and frame section having a pair of upwardly extending members carried in said opening through said first body and frame section and positioned one on each side of the axis of rotation of said first pair of wheels, pin means pivotally connecting each of said depending members of said horizontal leg to one of said upwardly extending members in said opening for pivotal movement of said first body and frame section about said second axis, said vertical leg of said yoke being positioned to depend from said horizontal leg and connected to said second body and frame section for pivoting of said first body and frame section relative to said second body and frame section about said first axis.

7. In an articulated motor vehicle construction a forward vehicle section, a first pair of wheels carried at each end of an axle assembly, said forward vehicle section including a frame portion comprising a pair of spaced-apart plates supporting substantially the remainder of said forward vehicle section at the upper portion of said plates, means connecting each of said plates to said axle assembly at each end thereof and between said first pair of wheels so that said pair of plates upstand therefrom and form an opening of substantial size disposed longitudinally through said forward vehicle section and defined by the upper side of said axle assembly, said pair of plates and the underside of said remainder of said forward vehicle section, a rearward vehicle section including side walls carried on a second pair of wheels, means pivotally interconnecting said forward and rearward vehicle sections for relative pivotal movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said longitudinal opening of said forward vehicle section, said horizontal leg having a pair of longitudinally spaced apart depending members, said forward vehicle section having a pair of upwardly extending members carried in said longitudinal opening and positioned one on each side of the axis of rotation of said first pair of wheels, pin means pivotally connecting each of said depending members of said horizontal leg to one of said upwardly extending members in said longitudinal opening for pivotal movement of said forward vehicle section about said second axis, said vertical leg of said yoke being positioned to depend from said horizontal leg and connected to said rearward vehicle section for pivoting of said forward vehicle section relative to said rearward vehicle section about said first axis.

8. In an articulated motor vehicle construction as claimed in claim 7 wherein a pair of hydraulic steering rams are provided, means pivotally connecting one end of each of said rams to a respective side of said horizontal leg intermediate the ends thereof, and means pivotally connecting the other end of each of said rams to one of the side walls of said rearward vehicle section at the forward end thereof.

9. In an articulated motor vehicle construction, a first body and frame section, a first pair of wheels carried at each end of an axle assembly, a portion of said first body and frame section comprising a pair of spaced-apart plates, means connecting the lower portion of each of said plates to said axle assembly at each end thereof and between said first pair of wheels so that said pair of plates upstand therefrom; the body portion of said first body and frame section being formed and carried at the upper end of said pair of plates so that an opening of substantial size is formed longitudinally through said first body and frame section and defined by the upper side of said axle assembly, said pair of plates and the underside of said body portion of said first body and frame section; a pair of supporting members, means connecting one of said supporting members between said pair of spaced-apart plates transversely of said vehicle and forwardly and above the axis of said axle assembly, means connecting the other of said supporting members between said pair of spaced-apart plates transversely of said vehicle and at a position rearwardly of and above the axis of said axle assembly, a second body and frame section carried on a second pair of wheels, means pivotally interconnecting said first and second body and frame sections for relative pivotal movement about a first axis disposed between said first and second body and frame sections and positioned substantially vertically at the transverse center of said vehicle and about a second axis positioned longitudinally of said vehicle and at the transverse center thereof, said means comprising a L-shaped yoke having a vertical leg and a horizontal leg, said horizontal leg being positioned to extend through said opening of said first body and frame section, means pivotally interconnecting the underside of said horizontal leg to each of said supporting members for pivotal movement about said second axis with said horizontal leg positioned through said opening of said first body and frame section, said vertical leg of said yoke being positioned to depend from said horizontal leg and connected to said second body and frame section for pivoting of said first body and frame section relative to said second body and frame section about said first axis.

10. In an articulated motor vehicle construction, a forward vehicle section, a first pair of wheels carried at each end of an axle assembly, said forward vehicle section including a frame comprising a pair of spaced-apart plates, means connecting the lower portion of each of said plates to said axle assembly at each end thereof and between said first pair of wheels so that said pair of plates upstand therefrom; said forward vehicle section including a portion being formed and carried substantially at the upper end of said pair of plates so that an opening of substantial size is formed longitudinally through said forward vehicle section and defined by the upper side of said axle assembly, said pair of plates and the underside of said forward vehicle section; a pair of supporting members, means securing one of said supporting members transversely between said pair of plates at a position forwardly and above the axis of said axle assembly, means securing the other of said supporting members transversely between said pair of plates at a position rearwardly and above the axis of said axle assembly, a rearward vehicle section carried on a second pair of wheels, means pivotally interconnecting said forward and rearward vehicle sections for relative pivotal movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend longitudinally through said opening of said forward vehicle section, means pivotally connecting the underside of said horizontal leg to said pair of said supporting members for pivotal movement of said yoke about said second axis, said vertical leg of said yoke being positioned to depend from said horizontal leg and connected to said rearward vehicle section for pivoting of said forward vehicle section relative to said rearward vehicle section about said first axis.

11. In an articulated motor vehicle construction as defined in claim 10 wherein a pair of hydraulic steering rams are provided, means pivotally connecting one end of each of said rams on a respective side of said horizontal leg intermediate the ends thereof, and means pivotally connecting the other end of each of said rams to a corresponding side of said rearward vehicle section substantially at the forward side marginal edges thereof.

12. In an articulated motor vehicle construction, a forward vehicle section, a first pair of wheels carried at each end of an axle assembly, said forward vehicle section including a frame portion comprising a pair of spaced-apart plates, means securing each of said plates to said axle assembly at each end thereof and between said first pair of wheels so that said pair of plates upstand therefrom; said forward vehicle section further including an operator's compartment formed and carried on the upper end of said pair of plates and extending thereacross so that a longitudinal opening through said forward vehicle section is defined by the upper side of said axle assembly, said pair of plates and the underside of said operator's compartment; a pair of supporting members, one of said supporting members secured between said pair of plates at a position forwardly of and immediately above the axis of rotation of said axle assembly, the other of said pair of supporting members being secured between said pair of plates transversely of said forward vehicle section and at a position rearwardly and immediately above the axis of rotation of said axle assembly, a rearward vehicle section carried on a second pair of wheels and including an engine compartment, means pivotally interconnecting said forward and rearward vehicle sections for relative movement about a first axis disposed between said forward and rearward vehicle sections and positioned substantially vertically at the transverse center of said vehicle and about a second axis positioned longitudinally of the vehicle and at the transverse center thereof, said means comprising a L-shaped yoke having a vertical leg and a horizontal leg, said horizontal leg being positioned to extend through said longitudinal opening of said forward vehicle section, flange and pin means carried on the underside of said horizontal leg and pivotally connected to said pair of supporting members for pivotal movement of said yoke relative to said forward vehicle section about said second axis, said vertical leg of said yoke being positioned to depend from said horizontal leg, second flange and pin means carried by said vertical leg at each end thereof and connected to said rearward vehicle section for pivoting of said forward vehicle section relative to said rearward vehicle section about said first axis.

References Cited in the file of this patent

UNITED STATES PATENTS

| 1,285,841 | Tinker | Nov. 26, 1918 |
| 1,391,011 | Schneider | Sept. 20, 1921 |
| 2,835,397 | Wagner | May 20, 1958 |

FOREIGN PATENTS

| 564,082 | France | Oct. 12, 1923 |
| 840,263 | Great Britain | July 1960 |